UNITED STATES PATENT OFFICE.

JAMES B. GARNER AND HOWARD D. CLAYTON, OF PITTSBURGH, PENNSYLVANIA, ASSIGNORS TO METALS RESEARCH COMPANY, OF NEW YORK, N. Y., A CORPORATION OF MAINE.

MANUFACTURE OF CHLORINATED HYDROCARBONS.

1,262,769.  Specification of Letters Patent.  Patented Apr. 16, 1918.

No Drawing.  Application filed June 23, 1915. Serial No. 35,820.

*To all whom it may concern:*

Be it known that we, JAMES B. GARNER and HOWARD D. CLAYTON, both citizens of the United States, and residents of Pittsburgh, Allegheny county, State of Pennsylvania, have invented certain new and useful Improvements in the Manufacture of Chlorinated Hydrocarbons; and we do hereby declare the following to be a full, clear, and exact description of the invention, such as will enable others skilled in the art to which it appertains to make and use the same.

Our invention relates to the manufacture of chlorinated derivatives of hydrocarbons, including members of the marsh gas or paraffin series of hydrocarbons, the olefin series of hydrocarbons and the benzene series of hydrocarbons, or mixtures of members of the same or different series, by treating such hydrocarbons with chlorin. A particularly valuable application of our invention relates to the chlorination of mixtures of hydrocarbons such as occur in natural gas, and to the production of mixtures of chlorinated derivatives therefrom.

Many attempts have heretofore been made to chlorinate natural gas, but so far as we are aware, it has been found that the reactions which took place did so more or less violently and with more or less irregularity, thus resulting in products varying in character and amount.

We have found that by using charcoal as a catalyzer the reactions can be made to proceed smoothly and regularly, with the resulting production of products definite and regulable in character and amount. We have further found that by using a considerable excess of the natural gas, the chlorination of the hydrocarbons can be selectively effected with the resulting production of mixtures of chlorinated derivatives containing relatively larger quantities of the chlorinated derivatives of the simpler hydrocarbons and less quantities of the chlorinated derivatives of the more complex hydrocarbons.

The process of our invention is generally applicable to the chlorination of hydrocarbons, such as above mentioned, and the production of chlorinated derivatives therefrom, whether such hydrocarbons are used alone or in admixture with other hydrocarbons.

A prominent industrial and commercial application of the invention is typified in the chlorination of natural gas, which comprises a mixture of hydrocarbon gases whose chlorination exhibits to particular advantage the utility of the invention and its ready adaptability to widely extended use.

A typical natural gas capable of chlorination in accordance with our invention is, for instance, the natural gas used at Pittsburgh, Pa., containing methane (84.7%) ethane (9.4%), propane (3.0%), and other paraffins,—all gases more or less moist.

According to our invention the natural gas, or the hydrocarbon or mixture of hydrocarbons, is caused to react with chlorin in the presence of charcoal as a catalyzer. The charcoal may be either of vegetable or animal origin, and produced in any suitable manner. In some cases it can with advantage be used in a freshly produced or freshly calcined condition. The reaction chamber is filled more or less completely with the charcoal of a sufficient size to permit the free penetration of the mixture of gases throughout the mass, and the mixture of chlorin and hydrocarbons is passed therethrough, the chamber being heated to a suitable temperature to cause the desired reaction to take place. In order that the gases may be more uniformly and thoroughly mixed before their reaction, and the process thus made to take place in a smoother and more advantageous manner, the gases can first be passed through a body of charcoal at a low temperature and given a preliminary mixing before being passed into the main body of charcoal heated to the reacting temperature.

The products of the reaction are hydrogen chlorid, and the chlorinated derivatives of the hydrocarbons treated. In the case of natural gas of the composition indicated, the following chlorinated derivatives in varying proportions may be produced,— mono-, di-, tri-, and tetra-chlormethane; chlor-, 1-2-dichlor-, 1-1-dichlor-, 1-1-1-trichlor-, 1-1-2-trichlor-, 1-1-1-2-tetrachlor-, 1-1-2-2-tetrachlor-, pentachlor-, and hexachlorethane; and monochlor-, ortho-, meta-, and para-dichlor-, and 1-2-3-, 1-2-4-, and 1-3-5-trichlor-benzene.

The nature and advantages of the invention will more fully and clearly appear from the following more detailed description of specific applications of our process to the chlorination of natural gas.

The mixture of chlorin and Pittsburgh natural gas, the constituents of which are for the most part methane, ethane, propane and other paraffins—all gases more or less moist—in the proportion of about 50 volumes of natural gas to 33 of chlorin, is led into the reaction chamber more or less completely filled with charcoal. The chamber containing the charcoal, and into which the mixture of chlorin and natural gas is led, is protected from the direct action of sunlight. We have found it advisable in carrying out the above reaction to allow the interacting gases to mix more or less thoroughly, before they are brought into contact with the heated charcoal, and to this end, approximately half the chamber can be maintained at room temperature, and the remainder heated to about 300° C., the mixture of gases entering first the cool body of charcoal and thereafter passing to the body of charcoal heated to the reacting temperature.

The preliminary heating of the charcoal, and the subsequent regulation of the temperature thereof, can be effected in any suitable manner.

The hydrogen chlorid and chlorinated derivatives of the hydrocarbons, produced by the reaction, are collected in suitable vessels, the chlorinated derivatives being collected in a vessel surrounded by or provided with a cooling system which maintains the temperature of the vessel at minus 30° C. or lower. The hydrogen chlorid escaping from the exit of the vessel, in which the chlorinated hydrocarbon products are collected, is dissolved in water to form a solution of hydrochloric acid. Any excess of the natural gas escaping reaction is for the most part insoluble in water and is led from the vessel in which the hydrogen chlorid is absorbed, and is used over again in the system.

The principal reaction may be expressed by the following equation:

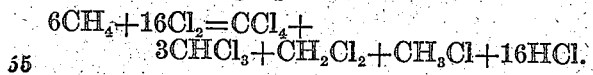
$$6CH_4 + 16Cl_2 = CCl_4 + 3CHCl_3 + CH_2Cl_2 + CH_3Cl + 16HCl.$$

This equation, however, is used for purposes of illustration only and it is apparent that the amount and kind of products indicated will vary with the composition of the natural gas, as well as with the amounts of the reacting gases used.

The secondary reactions take place to a far lesser extent and result in the formation of minor quantities of the chlorinated derivatives of the other hydrocarbons present, such as ethane, ethylene, and benzene. The nature of these chlorinated derivatives, not produced by the principal reaction illustrated by above equation, has already been mentioned.

We have further found that if the quantities of the chlorin and natural gas interacting be varied, the relative quantities of the various products resulting will be changed accordingly.

Thus if the mixture consists of about 50 volumes of Pittsburgh natural gas and 20 volumes of chlorin, and is treated as already described, it is found that the reaction results in the formation of relatively larger quantities of the chlorinated derivatives of the simpler hydrocarbons and a far less quantity of the chlorinated derivatives of the more complex hydrocarbons, than when 50 volumes of the natural gas and 33 volumes of chlorin are used. The principal reaction products are methyl chlorid, methylene chlorid, chloroform, carbon-tetrachlorid, and hydrogen chlorid.

It is found that the charcoal is not altered during the reaction, its function being that of a catalyzer, which, as hereinbefore noted, causes the reactions to take place more smoothly, without explosive violence, and with great regularity and uniformity.

What we claim is:

1. The method of chlorinating natural gas in a smooth and regular manner, which comprises causing it to react with chlorin in the presence of charcoal; substantially as described.

2. The method of chlorinating natural gas in a smooth and regular manner, which comprises causing it to react with chlorin in the presence of charcoal, and recovering separately the resulting chlorinated hydrocarbon products and the hydrogen chlorid resulting from the reaction; substantially as described.

3. The method of treating natural gas, which comprises causing it to react with chlorin in the presence of charcoal, condensing out the chlorinated hydrocarbon products, and absorbing in water the hydrogen chlorid resulting from the reaction; substantially as described.

4. The process of chlorinating natural gas in a smooth and regular manner which comprises passing an excess of the gas, together with chlorin, through a body of charcoal as catalytic at a suitable temperature, separating the chlorinated hydrocarbons and hydrogen chlorid and subjecting the unchlorinated gas to further chlorination; substantially as described.

5. The process of chlorinating natural gas containing mainly lighter hydrocarbons of the paraffin series and of producing therefrom mixtures of chlorinated derivatives of such hydrocarbons which comprises passing an excess of the gas, together with chlorin, through a body of charcoal as catalytic at a suitable temperature, and thereby effecting a selective chlorination of such hydrocarbons; substantially as described.

6. The process of chlorinating hydrocarbons in a smooth and regular manner which comprises mixing the hydrocarbons with chlorin in a body of charcoal at a low temperature and thereafter passing the mixture through a body of charcoal heated to about 300° C.; substantially as described.

7. The process of chlorinating natural gas in a smooth and regular manner which comprises mixing the natural gas with chlorin in a body of charcoal at a low temperature and thereafter passing the mixture through a body of charcoal heated to about 300° C.; substantially as described.

8. The process of chlorinating hydrocarbons in a smooth and regular manner which comprises passing the hydrocarbon together with chlorin through a body of charcoal as catalytic at a temperature of about 300° C.; substantially as described.

9. The method of chlorinating a gas containing methane in a smooth and regular manner which comprises causing the gas containing methane to react with chlorin in the presence of charcoal; substantially as described.

10. The process of chlorinating a gaseous mixture of hydrocarbons containing methane in a smooth and regular manner and of producing therefrom mixtures of chlorinated derivatives of such hydrocarbons which comprises passing an excess of the gaseous mixture, together with chlorin, through a body of charcoal as catalytic at a suitable temperature, and thereby effecting a selective chlorination of such hydrocarbons; substantially as described.

In testimony whereof we affix our signatures.

JAMES B. GARNER.
HOWARD D. CLAYTON.